(No Model.)
O. F. GARVEY.
LOCK NUT.
No. 291,328. Patented Jan. 1, 1884.
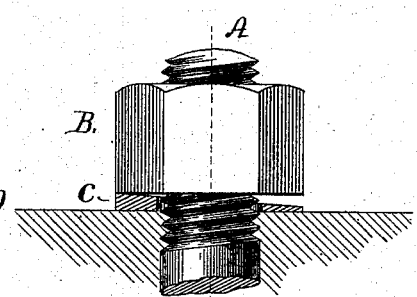
Fig. 4a  Fig. 1.
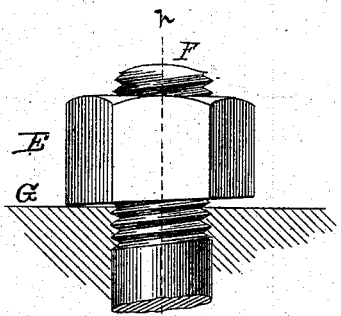
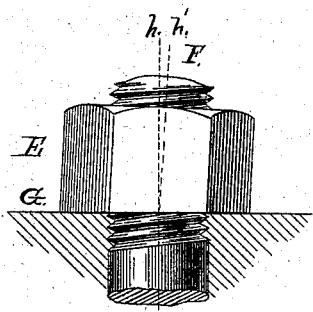
Fig. 2.  Fig. 3.
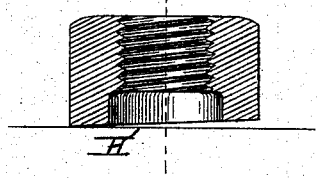
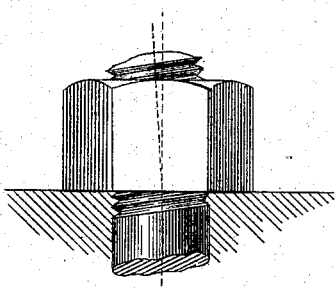
Fig. 5  Fig. 4
Witnesses.
Charles H. Titus
G. M. Carpenter Jr.
Inventor.
Owen F. Garvey
By Walter B. Vincent Atty.
N. PETERS. Photo-Lithographer, Washington, D. C.

United States Patent Office.

OWEN F. GARVEY, OF PAWTUCKET, RHODE ISLAND.

LOCK-NUT.

SPECIFICATION forming part of Letters Patent No. 291,328, dated January 1, 1884.

Application filed April 7, 1883. (No model.)

*To all whom it may concern:*

Be it known that I, OWEN F. GARVEY, of Pawtucket, in the State of Rhode Island, have made certain new and useful Improvements in Lock-Nuts, of which the following is a specification.

I produce a nut somewhat after the manner of those already known, in which the construction of nut or washer causes the bolt to be bent when the nut is screwed on, which bending of the bolt locks the nut; but in my device I provide a means whereby the bending of the bolt is facilitated, and also whereby the form of the interior walls of the nut is changed.

The accompanying drawings illustrate the means heretofore pursued in locking the nut, as also my improved device for the same purpose.

Figure 1 shows a side view of a nut and bolt with section of inclined washer and shoulder. A is the bolt, B the nut, C the washer, and D the shoulder. When the nut is screwed down so as to come in contact with the washer all around, the bolt will be bent.

Figs. 2 and 3 illustrate side views of a bolt and nut with inclined under face. In these views, F represents the bolt, E the nut, and G the shoulder. When the nut is screwed down, as shown in Fig. 3, it will deflect the bolt, as shown by center lines, $h$ and $h'$, marking the centers when in different positions.

Fig. 4 is another form of nut for the same purpose, which is made with parallel top and bottom, but has the threaded opening set at an angle.

These forms without my improvement are well known, and I lay no claim to them.

My invention may be applied to any of the forms shown, and is illustrated in a nut with an inclined opening, as described for Fig. 4, by sectional view Fig. 4ª, or with an inclined base, such as shown in Fig. 2, by the sectional view Fig. 5.

It consists in providing an enlargement, H, in the base of the screw-threaded opening of the nut, to facilitate the bending of the bolt. This enlarged opening H may be made in the process of manufacturing the nut or after the nut is completed.

Having thus described my invention, what I desire to claim and secure by Letters Patent is—

A nut provided with a screw-threaded opening set at an oblique angle to one or both faces of the nut, and having an enlargement, H, at the base of said screw-threaded opening, as set forth.

OWEN F. GARVEY.

Witnesses:
 WALTER B. VINCENT,
 JAMES O. HERN.